310-334 SR
XR 3,329,408
TX89213
X89237
(1)

TRANSDUCER MOUNTING ARRANGEMENT

Filed March 29, 1965

INVENTOR.
NORMAN G. BRANSON
BY
Ervin B. Steinberg

3329408
OR IN 259/72

United States Patent Office 3,329,408

Patented July 4, 1967

3,329,408

TRANSDUCER MOUNTING ARRANGEMENT

Norman Garver Branson, Stamford, Conn., assignor, by mesne assignments, to Branson Instruments, Incorporated, Stamford, Conn., a corporation of Delaware Filed Mar. 29, 1965, Ser. No. 443,568

5 Claims. (Cl. 259—72)

This invention generally refers to an arrangement for mounting electromechanical transducers and, more particularly, has reference to a method and means for mounting electromechanical transducers to a tank adapted to contain a cleaning solution which is subjected to cavitation produced by the sonic vibrations of the transducers. Quite specifically, this invention concerns a method and arrangement for removably fastening one or more sonic energy producing transducers to the outer surface of a cleaning tank in order to impart cavitation to the liquid in the tank. The transducers are mounted in such a manner as to obtain a high degree of coupling for the longitudinal vibrational waves from the transducers to the tank surface, while the propagation of lateral vibrational waves is suppressed by decoupling means.

The art of cleaning articles using an acoustically cavitated cleaning solution is well established. Generally, the arrangement comprises a liquid containing metal tank to which are mounted one or more electromechanical transducers which, when energized with high frequency, convert electrical energy to mechanical vibrations in the sonic or ultrasonic frequency range. The transducers are mounted frequently to the bottom plate of the tank, or to one or more side walls of the tank, and in another construction are disposed in a separate liquid tight enclosure which is immersed in the tank. Transducers most commonly employed are those using a piezoelectric disk or disks for converting the electrical energy to mechanical vibration, known as electrostrictive transducers, or magnetostrictive transducers which make use of the magnetostrictive properties of certain materials. Both transducer designs are well established and known to those skilled in the art.

The mechanical attachment of transducers to a cleaning tank presents certain problems. Magnetostrictive transducers are frequently welded or brazed to the tank wall or to the tank bottom in order to provide intimate contact and thereby assure efficient transfer of vibrational energy. Another well known method used, particularly for the electrostrictive transducers, comprises the bonding of the front face of such transducers to the cleaning tank by means of a suitable epoxy resin.

Although the above methods are quite satisfactory, it occurs that one or more transducers becomes defective and needs to be replaced. Various efforts have been made to design a structure which would permit a fast and relatively simple procedure for replacing in the field one or more defective transducers and although several designs have been developed, many suffer from constructional deficiencies in the degree with which the transfer of vibrational energy from the transducer to the tank and the cleaning solution is achieved. Also, brazing or welding as well as the heat curing of epoxy resins in many instances constitutes an undesired extra manufacturing step.

The design disclosed hereafter reveals a sonic or ultrasonic transducer mounting arrangement which makes use of a clad metal plate having a comparatively thick backing layer to which individual electromechanical transducers are removably fastened. The fastening means comprise a threaded bolt or a screw anchored in the backing layer of the clad plate. Due to the molecular bond which normally exists between two clad metals, an unusually high degree of vibrational energy transfer is achieved.

In order to avoid the cross-coupling of transducers by vibrational energy, which energy is propagated in a direction parallel to the plane of the clad plate, the relatively thick backing layer is provided with suitable decoupling means. The latter, in a preferred embodiment, comprises areas of reduced thickness so disposed as to separate adjacent transducers.

One of the principal objects of this invention, therefore, is the provision of a new and improved mounting arrangement for sonic and ultrasonic electromechanical transducers.

Another object of this invention is the provision of a novel transducer mounting arrangement for removably fastening electromechanical transducers to a plate which is adapted to form a part of a cleaning tank.

Another object of this invention is the provision of a transducer mounting arrangement wherein individual transducers are mounted to a clad plate, which plate by virtue of its molecular bond between the cladded layers provides a high degree of vibrational energy transfer.

A further object of this invention is the provision of a transducer mounting arrangement wherein a plurality of transducers is removably fastened to a metal plate, each transducer being readily replaceably in the field and wherein this metal plate is provided with means to suppress vibrations along a non-desired plane.

A further and other object of this invention is the provision of a transducer mounting arrangement for an ultrasonic cleaning tank wherein a plurality of electromechanical transducers is screw fastened to a comparatively thick clad metal plate comprising two different metals and wherein this metal plate is characterized by a highly efficient transfer of vibrational energy in a direction normal to the plane of the plate and includes, moreover, means to substantially suppress vibrational energy propagated along a direction parallel to the plane of the plate.

A further and still other object of this invention is a relatively inexpensive and simple method for quickly and conveniently replacing one or more electromechanical transducer elements among a plurality of such elements, such replacement procedure being possible without special tools, processes, or post-treatments.

Still further and other objects of this invention will be more clearly apparent by reference to the following description when taken in conjunction with the accompanying drawings in which.

Figures 1, 2, 3:
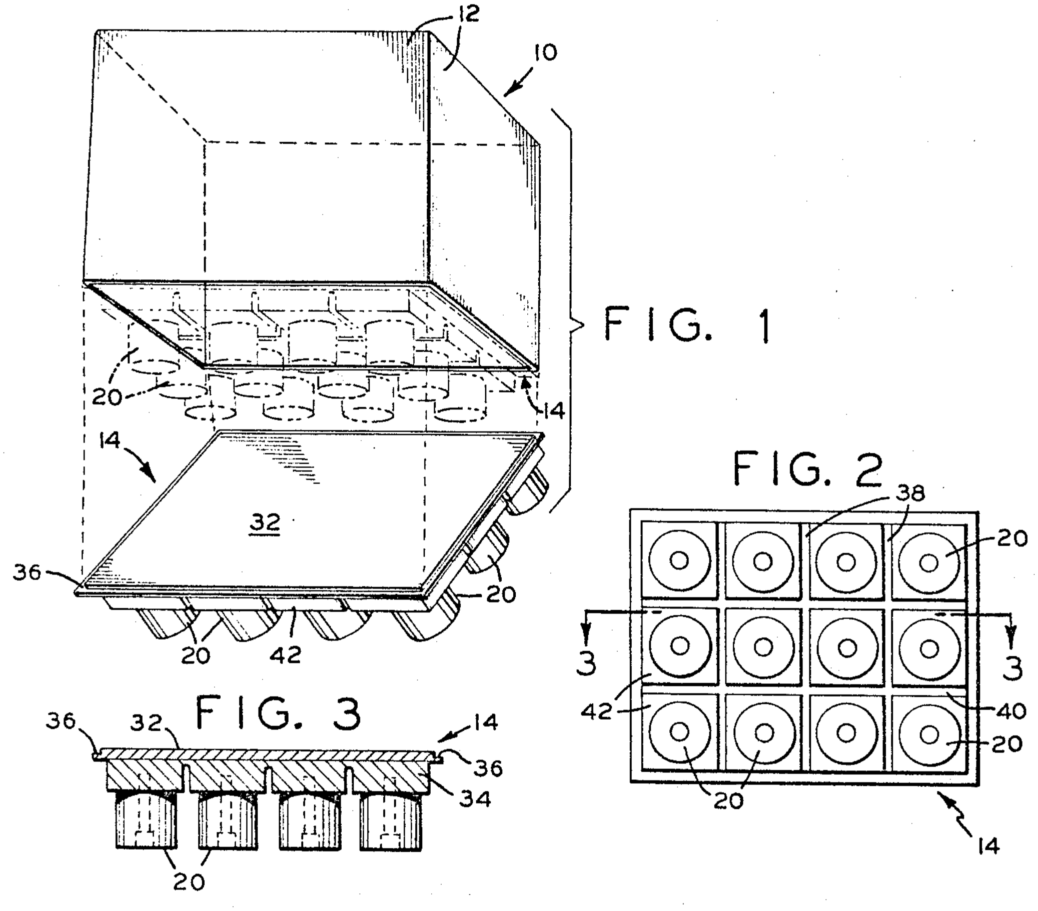
FIGURE 1 is a perspective view of a typical cleaning tank, the bottom plate of which is provided with a plurality of electromechanical transducers mounted to the outer surface thereof.
FIGURE 2 is a plan view of the bottom plate.
FIGURE 3 is a section along lines 3—3 in FIGURE 2.

Referring now to the figures and FIGURE 1 in particular, numeral 10 generally refers to a sonic or ultrasonic cleaning tank, comprising four upstanding side walls 12 and a bottom plate 14. The tank is adapted to contain a cleaning solution such as water, Freon, trichlorethylene or any other suitable cleaning solution well known in the art. The outer surface of the bottom plate carries an array of electromechanical transducers 20 which, when energized with high frequency electrical energy, produce vibrations that are transferred to the tank bottom to thereby cavitate the liquid inside the tank.

Figure 4:
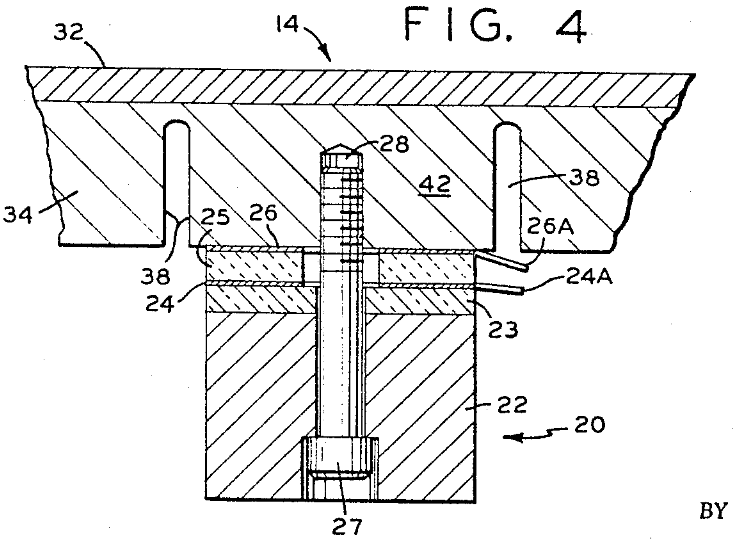
FIGURE 4 is a sectional view showing a typical piezoelectric transducer and its mounting to the bottom plate.

Although the electromechanical transducers shown in FIGURES 2–4 depict a typical electrostrictive transducer construction, it should be clearly understood that the teachings disclosed hereafter apply equally to transducers of the magnetostrictive type.

Referring now to FIGURES 2, 3, and 4 there is shown a clad metal plate comprising a front layer 32 and a backing layer 34. In a typical case, the front layer 32 is stainless steel, approximately ¼ inch thick, and the backing layer is ordinary steel, typically one inch thick. Both layers of steel are bonded together by standard methods as are well known in the steel fabricating industry so as to obtain a molecular bond at the interface between the layers 32 and 34. Alternatively, the backing layer 34 may comprise a non-ferrous metal such as aluminum, magnesium, and the like. The front surface of the stainless steel layer 32 is provided with a machined flanged edge 36 in order to meet with the remaining tank structure and to be arc welded to the tank structure. This is accomplished quite readily by the Heli-Arc method. The comparatively thick backing layer 34 is provided with a grid of machined grooves 38 and 40 whose depth reaches almost to the interface between the layers 32 and 34. These grooves, therefore, reduce the thickness of the backing layer and constitute a decoupling means. It should be understood that the precise shape of the grooves is not material and that instead of providing a rectangular grid, the grooves could be in a circular pattern so as to leave the individual islands 42 to which a respective transducer element is attached. Also, the grooves may be of different cross-sectional shape.

By reference to FIGURE 2 it will be noted that each of the plurality of transducers 20 is separated from an adjacent transducer by a groove, the grooves serving to suppress the propagation of vibrational energy in a direction parallel to the plane of the clad plate. Each of the typical electromechanical transducers, FIGURE 4, comprises a laminated structure which includes a cylindrical rear mass 22, an insulating wafer 23 made of glass or aluminum oxide, a soft metallic shim 24 having a connecting extension 24A, a piezoelectric wafer 25, for instance lead zirconate titanate, and an optional soft metallic shim 26 which is provided also with a connecting extension 26A. The extensions 24A and 26A serve to apply an alternating potential across the piezoelectric wafer 25. The entire assembly is held together and in intimate contact with the exposed rear surface of the backing layer 34 by means of a recessed threaded bolt 27 which engages a tapped blind hole 28 in the backing layer 34. The bolt is tightened to be under sufficient tension to provide intimate compressional contact between all of the interfaces and particularly between the front face of the transducer and the backing layer surface. In order to assure intimate contact and good transmission of vibration, all radial surfaces are suitably machined, ground, or lapped and the electrode shims 24 and 26 comprise very thin soft brass or other suitable material. As will be noted, the clad plate 14 constitutes the front mass of the transducer and, hence, constitutes an integral part of the vibratory system.

When applying high frequency electrical energy of suitable voltage to the extensions 24A and 26A, the piezoelectric disk 25 changes its shape to provide longitudinal vibrational energy which is propagated in a direction normal to the plane of the backing layer 34 and transmitted substantially without loss on account of the molecular bonding being the layers 32 and 34 to the front layer 34 and to the cleaning solution. Due to the excellent bond between the layers 32 and 34, very little vibrational energy is lost in this direction. As the electromechanical transducer vibrates in the longitudinal mode and produces vibrational energy, there is created also vibrational energy in the direction substantially parallel to the plane of the backing layer. This transverse energy, if left unchecked, would cause cross-coupling, thereby seriously reducing the efficiency and vibration of this plate in the longitudinal wave direction. The provision of decoupling means, such as the grooves 38 and 40, substantially suppresses the propagation of vibrational waves in the direction parallel to the plane of the bottom plate 14 and thus accounts for the passage of energy primarily along one major axis.

The replacement of one or more transducers is readily achieved by loosening the screw 27 and replacing one or more of the individual components of the transducer. The tightening of the screw 27 is accomplished most suitably by a torque wrench. Alternatively, a bolt can be anchored in the respective threaded holes 28 and compressive tightening of the transducer elements accomplished by a threaded nut.

Tests carried out on a tank construction per this construction have shown that this arrangement constitutes a highly efficient transducer mounting system which, when incorporated in a tank provides cavitation at relatively low power input levels. The simplicity and economy of this construction, and the ease with which transducer elements can be replaced, speedily and most convieniently, are readily apparent.

While there has been described and illustrated a certain preferred embodiment of the present invention, it will be apparent to those skilled in the art that various deviating from the principle and intent of the present invention which shall be limited only by scope of the appended claims.

What is claimed is:

1. A transducer mounting arrangement for a sonic cleaning tank comprising:
- a clad plate comprising a front layer made of a first metal adapted to be in contact with a cleaning solution and a backing layer made of a second metal;
- a plurality of spaced electromechanical transducers, each including a rear mass, removably fastened to said backing layer whereby a front face of each respective transducer is in intimate contact with the exposed side of said backing layer;
- each transducer, when energized with high frequency electrical energy, providing to said plate vibration in a direction normal to the plane of said plate;
- decoupling means which include alternating portions of thicker and thinner cross section provided in said backing layer for substantially suppressing the propagation of vibrational waves produced by said transducers parallel to the plane of said plate, and
- means on said backing plate for removably fastening each transducer to one of said thicker cross section portions.

2. A transducer mounting arrangement for a sonic cleaning tank as set forth in claim 1 wherein said front layer is made of stainless steel.

3. A sonic cleaning tank comprising in combination a tank structure and a clad metal plate forming a part of said tank structure;
- said clad metal plate comprising a front layer and a thicker backing layer bonded to said front layer;
- a plurality of piezoelectric transducers, each including a rear mass, removably fastened in spaced relationship to said backing layer whereby a front surface of each transducer is in intimate contact with the exposed side of said backing layer and each such transducer, when energized with high frequency electrical energy, provides to said plate vibration in a direction normal to the plane of said plate, said vibration causing a cleaning solution disposed in said tank structure to cavitate;
- vibration decoupling means which comprises grooves reducing the thickness of said backing layer at spaced intervals disposed in said backing layer for substantially suppressing the propagation of vibrational waves in a direction parallel to the plane of said plate, and
- means disposed in areas separated by said grooves of said backing layer for fastening a respective transducer to said backing layer and establishing intimate contact therewith.

4. A sonic cleaning tank as set forth in claim 3 wherein said front layer is stainless steel, each transducer includes a central bolt which threadedly engages a tapped hole in said backing layer, and said clad plate is joined to said tank structure by a weld.

5. A sonic cleaning tank comprising in combination a tank structure and a clad metal plate forming a part of said tank structure;

said clad metal plate comprising a front layer and a thicker backing layer bonded to said front layer;

a plurality of spaced piezoelectric transducers removably fastened to said backing layer;

each of said transducers including the stacked assembly of a piezoelectric wafer, an insulating wafer, a rear mass and a central bolt fastening such stacked transducer parts together and to said backing layer, whereby when applying high frequency electrical energy across the radial surfaces of said wafer, each transducer provides to said plate vibration in a direction normal to the plane of said plate, said vibration causing a cleaning solution disposed in said tank structure to cavitate;

vibration decoupling means which comprises a two-dimensional grid of grooves reducing the thickness of said backing layer disposed in said backing layer and separating the areas to which said transducers are fastened for substantially suppressing the propagation of vibrational waves in said plate in a direction parallel to the plane of said plate, and said bolt associated with each transducer being under tension to provide intimate contact and a compressive force between the respective transducer parts and the backing layer to which the transducer is fastened.

References Cited

UNITED STATES PATENTS

| | | | |
|---|---|---|---|
| 2,063,951 | 12/1936 | Steinberger | 310—8.7 X |
| 2,484,626 | 10/1949 | Keller | 310—8.7 X |
| 2,543,500 | 2/1951 | Kettering et al. | 310—8.7 X |
| 3,094,314 | 6/1963 | Kearney et al. | 259—72 |
| 3,113,761 | 12/1963 | Platzman | 259—72 |
| 3,183,378 | 5/1965 | McCracken et al. | 259—72 X |
| 3,218,488 | 11/1965 | Jacke | 310—8.7 X |

WALTER A. SCHEEL, *Primary Examiner.*

J. M. BELL, *Assistant Examiner.*